United States Patent
Wu et al.

(10) Patent No.: US 10,613,322 B2
(45) Date of Patent: Apr. 7, 2020

(54) DISPLAY DEVICE, DISPLAY METHOD AND HEAD-MOUNTED VIRTUAL DISPLAY HELMET

(71) Applicant: BOE Technology Group Co., Ltd., Beijing (CN)

(72) Inventors: Naifu Wu, Beijing (CN); Bing chuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 104 days.

(21) Appl. No.: 15/678,500

(22) Filed: Aug. 16, 2017

(65) Prior Publication Data
US 2018/0113302 A1 Apr. 26, 2018

(30) Foreign Application Priority Data
Oct. 24, 2016 (CN) .......................... 2016 1 0939825

(51) Int. Cl.
| | | |
|---|---|---|
| *G02B 27/00* | (2006.01) | |
| *G02B 27/01* | (2006.01) | |
| *G02B 5/00* | (2006.01) | |
| *G02B 9/04* | (2006.01) | |

(Continued)

(52) U.S. Cl.
CPC ......... *G02B 27/0025* (2013.01); *G02B 5/005* (2013.01); *G02B 9/04* (2013.01); *G02B 13/16* (2013.01); *G02B 26/02* (2013.01); *G02B 27/0172* (2013.01); *G02B 2027/012* (2013.01)

(58) Field of Classification Search
CPC .. G02B 27/0025; G02B 27/0172; G02B 9/04; G02B 13/16; G02B 26/02
See application file for complete search history.

(56) References Cited

U.S. PATENT DOCUMENTS

| | | |
|---|---|---|
| 6,967,986 B2 | 11/2005 | Kowarz et al. |
| 2004/0108971 A1* | 6/2004 | Waldern ............ G02B 27/0093 345/8 |

(Continued)

FOREIGN PATENT DOCUMENTS

| | | |
|---|---|---|
| CN | 1497272 A | 5/2004 |
| CN | 1892292 A | 1/2007 |
| CN | 101976032 A | 2/2011 |

(Continued)

OTHER PUBLICATIONS

R. Paschotta, article on 'optical apertures' in the RP Photonics Encyclopedia, (Oct. 2008) accessed on Sep. 21, 2019 available at https://www.rp-photonics.com/optical_apertures.html (Year: 2008).*

(Continued)

*Primary Examiner* — Jennifer D. Carruth
(74) *Attorney, Agent, or Firm* — Westman, Champlin & Koehler, P.A.

(57) ABSTRACT

Embodiments of the present disclosure disclose a display device, a display method and a head-mounted virtual display helmet. The display device includes: a display panel; and a first lens having a first focal length, a spatial filtering component configured for filtering and a second lens having a second focal length which are arranged in order at a light exit side of the display panel, wherein the second focal length is different from the first focal length.

12 Claims, 3 Drawing Sheets

(51) Int. Cl.
    *G02B 13/16*     (2006.01)
    *G02B 26/02*     (2006.01)

(56) References Cited

U.S. PATENT DOCUMENTS

2016/0011419 A1*   1/2016   Gao ................... G02B 27/0172
                                                                                      359/471
2016/0178907 A1    6/2016   Chang et al.

FOREIGN PATENT DOCUMENTS

| CN | 202631850 U | 12/2012 |
|---|---|---|
| CN | 103197429 A | 7/2013 |
| CN | 103995356 A | 8/2014 |
| CN | 106020431 A | 10/2016 |
| WO | 95/34841 A1 | 12/1995 |

OTHER PUBLICATIONS

Third Office Action, including Search Report, for Chinese Patent Application No. 201610939825.9, dated Dec. 11, 2017, 18 pages.
Engineering Optics, p. 302 to p. 308, including photos of the book, 21 pages.
Chinese Search Report for Chinese Patent Application No. 201610939825.9, dated Feb. 16, 2017, 10 pages.
First Office Action, including Search Report, for Chinese Patent Application No. 201610939825.9, dated Apr. 25, 2017, 10 pages.
Second Office Action, including Search Report, for Chinese Patent Application No. 201610939825.9, dated Aug. 14, 2017, 12 pages.

* cited by examiner

DISPLAY DEVICE, DISPLAY METHOD AND HEAD-MOUNTED VIRTUAL DISPLAY HELMET

CROSS-REFERENCE TO RELATED APPLICATION

This application claims the benefit of Chinese Patent Application No. 201610939825.9 filed on Oct. 24, 2016 in the State Intellectual Property Office of China, the disclosure of which is incorporated in entirety herein by reference.

BACKGROUND

Technical Field

Embodiments of the present disclosure relate to a field of display technology, and more particularly, to a display device, a display method and a head-mounted virtual display helmet.

Description of the Related Art

With the rapid development of science and technology, there are more and more kinds of displays intended to achieve stereoscopic display of a view object, and they have more and more functions. In order to allow users to better experience stereoscopic display effect, more and more attention has been paid to the research on displays.

In a virtual reality (referred to as VR) system, binocular stereoscopic vision plays a significant role. The different images viewed by a user's two eyes are separately generated and displayed on different displays. Some systems adopt a single display, but when the user wears a pair of special glasses, one eye can only see odd frame images, and the other eye can only see even frame images, difference between the odd frame images and the even frame images forms parallax, thereby generating the stereoscopic sense.

However, since the display screen is very close to the eyes, it makes a single pixel in the screen visible, such that a black mesh pattern occurs between the images viewed by the user. That is to say, there is a gap between the pixels. If you come close to a liquid crystal display screen and view it carefully, you will find such mesh lines, that is, pixel points. Such effect is called as "Screen Door Effect". Although the user does not pay too much attention to these details in the process of playing or watching and they may be ignored, this "Screen Door Effect" would lead to emergence of sawteeth and loss of details of a distant object. A high resolution display can alleviate this phenomenon, but it cannot totally eliminate this phenomenon, for example, the current display technology cannot address this problem.

Therefore, the "Screen Door Effect" constitutes a recognized difficult problem to be solved in the current virtual reality technology.

SUMMARY

An embodiment of the present disclosure provides a display device, comprising:
a display panel; and
a first lens having a first focal length, a spatial filtering component configured for filtering and a second lens having a second focal length which are arranged in order at a light exit side of the display panel,
wherein the second focal length is different from the first focal length.

In accordance with a possible embodiment, in the display device according to the embodiment, the spatial filtering component is a diaphragm having an aperture which has an adjustable diameter.

In accordance with a possible embodiment, in the display device according to the embodiment, a distance between the display panel and the first lens is equal to the first focal length.

In accordance with a possible embodiment, in the display device according to the embodiment, a distance between the diaphragm and the first lens is equal to the first focal length; and a distance between the diaphragm and the second lens is equal to the second focal length.

In accordance with a possible embodiment, in the display device according to the embodiment, the second focal length is greater than the first focal length.

In accordance with a possible embodiment, in the display device according to the embodiment, the first focal length is in a range of 50 mm to 70 mm.

In accordance with a possible embodiment, in the display device according to the embodiment, each of the first lens and the second lens is a convex lens.

In accordance with a possible embodiment, in the display device according to the embodiment, the first lens and the second lens have a same primary optical axis; and a central point of an aperture of the diaphragm is located on the primary optical axis.

In accordance with a possible embodiment, in the display device according to the embodiment, the display panel is a liquid crystal display panel or an electroluminescent display panel.

An embodiment of the present disclosure further provides a head-mounted virtual display helmet, comprising the display device according to the embodiments of the present disclosure.

An embodiment of the present disclosure further provides a display method for the display device according to the embodiments of the present disclosure, comprising:
filtering a light ray emitted from the display panel by adjusting the spatial filtering component after the light ray is processed by the first lens; and
transmitting the light ray to the second lens.

DETAILED DESCRIPTION OF PREFERRED EMBODIMENTS

Figure 1:
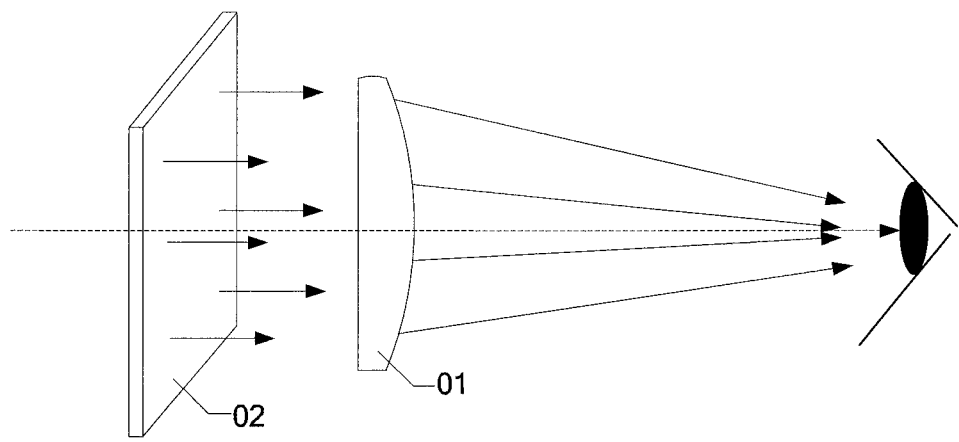
FIG. 1 is a schematic structural view of a related display device.

Hereinafter, specific implementations of a display device, a display method and a head-mounted virtual display helmet according to embodiments of the present disclosure will be described in detail with reference to the accompanying drawings.

Size and shape of various structures in the drawings do not represent a real scale of the display device, they are only intended to be illustrative of the present disclosure.

In general, as shown in FIG. 1, in order to realize a stereoscopic display effect in a short distance, a display uses a lens 01 to amplify a display screen 02 configured for displaying an object, then a stereoscopic image is viewed by a user's eyes According to the display device, the display method and the head-mounted virtual display helmet provided in the embodiments of the present disclosure, it can alleviate the "Screen Door Effect" due to screen resolution of the display panel, thereby improving viewing experience of the VR.

Figure 2:
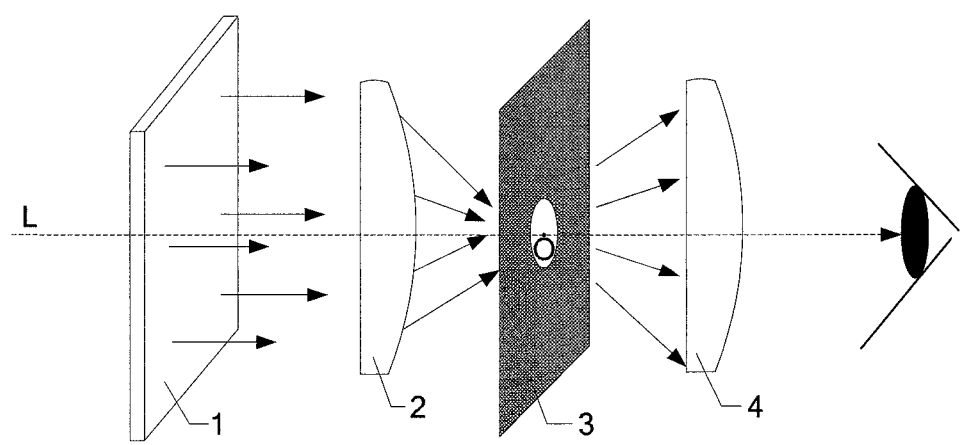
FIG. 2 is a schematic structural view of a display device according to an embodiment of the present disclosure.

As shown in FIG. 2, the embodiment of the present disclosure provides a display device, comprising: a display panel 1; and a first lens 2 having a first focal length, a spatial filtering component 3 configured for filtering and a second lens 4 having a second focal length which are arranged in order at a light exit side of the display panel 1. The second focal length is different from the first focal length.

In the above display device according to the embodiment of the present disclosure, the display device is provided with a display panel, and a first lens having a first focal length, a spatial filtering component configured for filtering and a second lens having a second focal length which are arranged in order at a light exit side of the display panel. By means of the spatial filtering component and a combination of two lenses that have two different focal lengths, the above-described display device according to the embodiment of the present disclosure can alleviate the "Screen Door Effect" due to screen resolution of the display panel, thereby improving viewing experience of the virtual reality VR.

It should be noted that spatial filtering is an important technique for optical information processing. Abbe Porter experiment is a typical experiment of spatial filtering. It was firstly proposed by Abbe in as early as 1893 and completed by Porter in 1906, and constitutes the most basic experiment of Fourier optics since it very vividly verifies and demonstrates Abbe's imaging principle. Herein it is necessary to repeat this experiment.

Abbe's imaging principle refers to that an imaging process by a lens can be divided into two steps: a first step is that a spatial spectrum is formed by diffraction light from an object on a back focal plane (i.e., spectrum plane) of the lens, that is, a "frequency division" function caused by a diffraction; a second step is that an image of the object is formed by coherent superposition of various light beams representing different spatial frequencies on an image plane, that is, a "synthesis" function caused by a coherence. The two steps of the imaging process are essentially two Fourier transformations. If the two Fourier transformations are perfectly ideal, that is, no information is lost, then the image and the object should be completely identical to each other. If some spatial filtering components are provided on the spectrum plane such that some of the spatial frequencies in the spectrum are blocked, then the image will be changed. That is to say, the spatial filtering refers to that various spatial filtering components are placed on the spectrum plane of an optical system such that some spatial frequencies are removed (or selectively transmitted) or amplitudes and phases thereof are changed. Thus, the image of the two-dimensional object can be improved as required.

Figure 3:
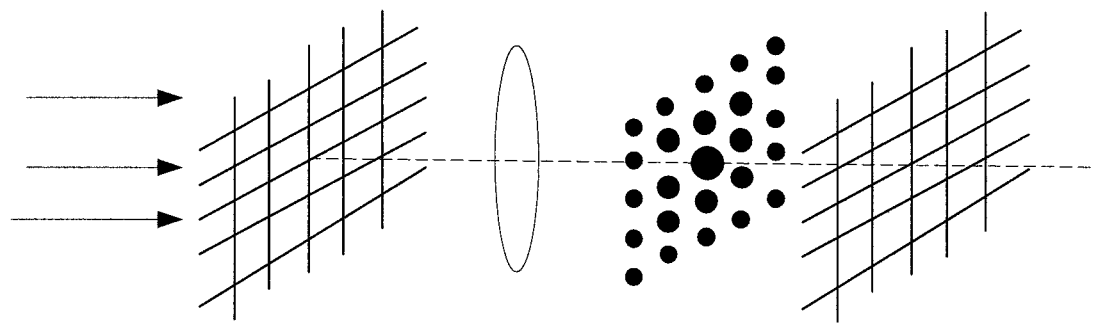
FIG. 3 is a schematic view showing an imaging principle of a virtual image after a parallel coherent beam illuminates a fine mesh.

As shown in FIG. 3, a fine mesh is illuminated by a parallel coherent beam, then a Fourier spectrum of periodic mesh appears on the back focal plane (i.e., the spectrum plane) of an imaging lens. Due to recombination of these Fourier spectrum components, an image of the mesh is reproduced on an image plane. If a variety of obstructions (such as, a diaphragm, a slit, or a small optical screen) are placed on the spectrum plane, the spectrum of the image can be changed in different ways, thereby a corresponding image which comes from a recombination of the changed spectrum components is obtained on the image plane.

Further, in the above-described display device according to the embodiment of the present disclosure, in order to enable the spatial filtering component to selectively filter, as shown in FIG. 2, the spatial filtering component 3 may be selected to be a diaphragm having an aperture which has an adjustable diameter. In this way, by adjusting the size of an aperture of the diaphragm, a virtual image pixel granular sensation issue and a virtual image overall picture clarity issue may be balanced when watching by human eyes, so as to achieve the best viewing experience, to further ensure the alleviation of "Screen Door Effect".

Figure 4:
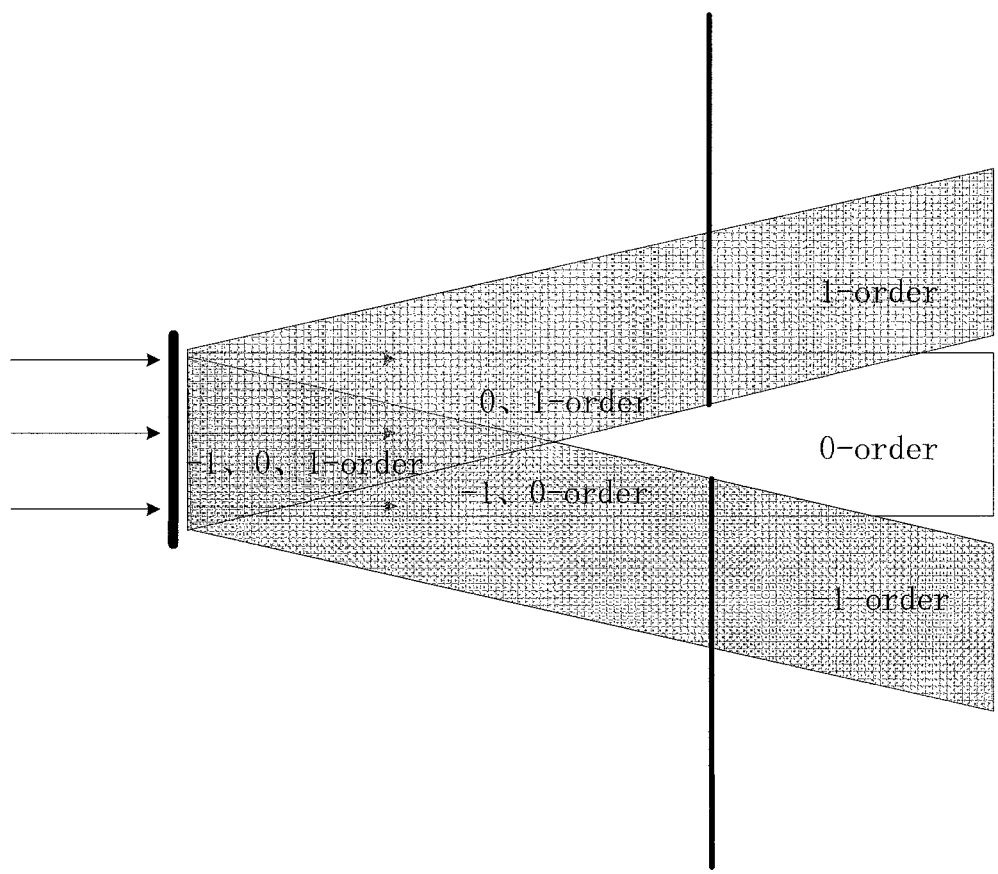
FIG. 4 is a schematic diagram showing a light ray passes through an aperture of a diaphragm.

In general, as shown in FIG. 4, the diaphragm having an aperture can be regarded as a slit device having an appropriate width, which functions to just allow zero-order spectrum to pass through. Therefore, the size of its aperture is related with placement position and included angle between positive and negative one-order light rays.

It should be noted that, for convenience of description, the above-described "a diaphragm having an aperture which has an adjustable diameter" may hereinafter be simply referred to as an adjustable diaphragm.

The structure of the adjustable diaphragm may be composed of a plurality of arc-shaped blades. Such series of adjustable diaphragm has a delicate structure, and upon a good assembly process, the damping between the blades may be moderate, without jerk and loose. An installation base for the adjustable diaphragm may be divided into two kinds. One is a half-moon-shaped opening structure with two locking hand wheel clamping the adjustable diaphragm, such structure is simple and easy to be used. The other is an enclosed package with outer ring having a scale, however, since the amount of change is not completely linearly related with the amount of adjustment when the arc-shaped blades are adjusted, the scale is just provided for reference.

In general, the adjustment of the adjustable diaphragm is carried out by a diaphragm adjustment ring sleeving and provided on an outer lens barrel. A portion of the diaphragm adjustment ring can be machined into a knurled hand wheel, and another portion of the diaphragm adjustment ring is engraved with diaphragm scale and numerals. The size of the aperture of the adjustable diaphragm may be adjusted by turning the hand wheel, and the size of the aperture may be determined according to the engraved numerals.

The aperture of the adjustable diaphragm may have a variety of shapes, such as square or circle, that is, the type of the adjustable diaphragm may be divided into a square aperture adjustable diaphragm and a circle aperture adjustable diaphragm. Optionally, a basic structure of the circle aperture adjustable diaphragm may include a movable ring, a fixed ring and diaphragm blades; the operation principle is that, the fixed ring is fixed when the diaphragm mechanism is operated and a fixing pin inserted into pin holes is only capable of rotating about a center of the pin holes, a slide groove in the movable ring drives a movable pin when the movable ring rotates about a center of the diaphragm such that the diaphragm blades swing relative to a pivot, i.e., a center of the fixing pin, then a light through hole composed of inner arcs of the diaphragm blades is changed from large to small or from small to large. The movable ring of the diaphragm can also be connected to an actuation motor of an automatic adjustment system through a certain transmission chain, so that the size of the aperture of the diaphragm is automatically and continuously adjusted according to a control signal of an automatic photometric system.

It is advantageous to use the adjustable diaphragm as the spatial filtering components in that: it is possible to continuously adjust the size of the center opening, thus it is easier to allow one or a portion of the frequency components on the spectrum plane to pass through, while blocking the other frequency components, that is, the size of the imaging beam may be controlled by special aperture sizes, thereby changing the frequency components of the image on the imaging plane. Therefore, when the spatial filtering component is selected as an adjustable diaphragm, the size of the aperture may be adjusted according to the viewing effect of the person. Considering that different persons have different perception sensitivity to black stripes, the adjustable diaphragm can be individually adjusted. By means of a low-pass filtering technology of the adjustable diaphragm that filters a high-frequency signal, the "Screen Door Effect" of the display is alleviated, thereby improving experience of the VR.

Figure 5:
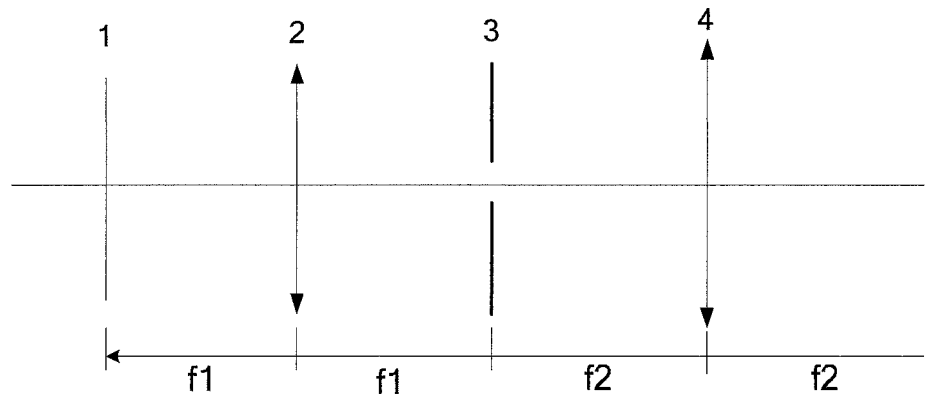
FIG. 5 is a simplified schematic structural view of a display device according to an embodiment of the present disclosure.

In accordance with a possible embodiment, in the above display device according to the embodiment, as shown in FIG. 5, a distance between the display panel 1 and the first lens 2 is equal to the first focal length f1. That is, the display panel 1 may be arranged at a front focal plane of the first lens 2.

Further, in accordance with a possible embodiment, in the above display device according to the embodiment, as shown in FIG. 5, a distance between the diaphragm and the first lens 2 is equal to the first focal length f1; and a distance between the diaphragm and the second lens 4 is equal to the second focal length f2. That is to say, the diaphragm is located at a middle spectrum plane. In this way, it not only meets requirements on Fourier transformation lens, but also plays a role of amplification imaging.

In accordance with a possible embodiment, in the above display device according to the embodiment, the second focal length f2 may be set to be greater than the first focal length f1, in order to further meet the requirements on amplification imaging, that is, f2>f1.

In accordance with a possible embodiment, in the above display device according to the embodiment, the first focal length is in a range of 50 mm to 70 mm, in order that the virtual image is imaged within a visible distance of the human eyes. Specifically, as for the setting of the first focal length, it may be determined according to the actual situations, which will not be limited herein.

In accordance with a possible embodiment, in the above display device according to the embodiment, each of the first lens 2 and the second lens 4 may be provided as a convex lens, in order to converge light rays, as shown in FIG. 2. The first lens 2 and the second lens 4 in FIG. 2 may be provided with a positive meniscus shape at a side away from the light exit side of the screen. Specifically, as for the shape of the first lens and the second lens, it may be determined according to the actual situations, which will not be limited herein.

In accordance with a possible embodiment, in the above display device according to the embodiment, the first lens 2 and the second lens 4 have a same primary optical axis L; and a central point O of an aperture of the diaphragm may be located on the primary optical axis L, as shown in FIG. 2. Since the human eyes are located at the true middle positions of the display device, it is possible to ensure that the sharpest image is viewed by adjusting the aperture size of the diaphragm.

In accordance with a possible embodiment, in the above display device according to the embodiment, the display panel may be a liquid crystal display panel or an electroluminescent display panel. As for the type of the display panel, it may be determined according to the actual situations, which will not be limited herein.

According to the same concept, the embodiment of the present disclosure also provides a display method for the above-described display device according to the above embodiments of the present disclosure. Since the method adopts the similar principle with the above-described display device to address technical problem, the implementation of the method may refer to the implementation of the display device, and the description will not be repeated.

The display method for the display device according to the embodiment of the present disclosure includes: filtering a light ray emitted from the display panel by adjusting the spatial filtering component after the light ray is processed by the first lens; and transmitting the light ray to the second lens.

It should be noted that, during adjusting the spatial filtering component, it needs human eyes to view. Considering that different persons have different perception sensitivity to black stripes, a virtual image pixel granular sensation issue and a virtual image overall picture clarity issue may be balanced, so as to further ensure the alleviation of "Screen Door Effect", to achieve the best viewing experience of VR.

According to the same concept, the embodiment of the present disclosure also provides a head-mounted virtual display helmet, comprising the display device according to the above embodiments of the present disclosure.

Figure 6:
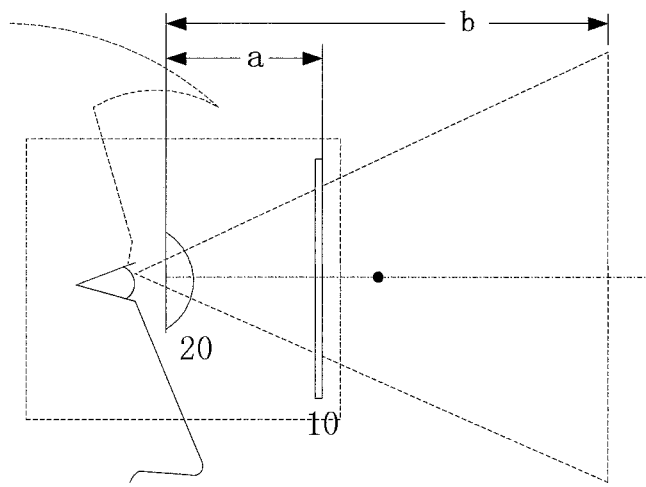
FIG. 6 is a schematic view showing an imaging principle of a virtual image in a head-mounted virtual display helmet.

As shown in FIG. 6, the conventional head-mounted virtual display helmet is mainly composed of a display screen 10 and an optical lens 20. Since the display screen 10 used in the head-mounted virtual display helmet is very close to the user's eyes, it is necessary for the used optical lens 20 to enlarge the image so as to provide a wider field of view as far as possible. The visible distance of the human eyes is about 25 cm, the optical lens 20 is typically arranged in front of the eyes by a distance from 2 cm to 3 cm, the distance a between the display screen 10 and the optical lens 20 is from 3 cm to 6 cm, then the virtual image is imaged in the front of the eyes by a distance b of about 25 cm to 50 cm.

In accordance with a possible embodiment, in the above head-mounted virtual display helmet according to the embodiment, providing that the combined lenses (the combination of the first lens and the second lens) has a focal length f of 7 cm, an object distance c (a distance between the display panel and the combined lenses, approximately, a distance between the display panel and the first lens) is 5.5 cm, then an image distance d (a distance between the image and the combined lenses, approximately, a distance between the image and the second lens) may be calculated. Herein, $d=-1/(1/f-1/a)=25.66$ cm, just approximately equal to the visible distance.

To this end, during the usage, it needs human eyes to view and adjusts the size of the adjustable diaphragm, so as to balance the virtual image pixel granular sensation issue and the virtual image overall picture clarity issue. In this way, it can alleviate the "Screen Door Effect" due to screen resolution of the display panel, thereby achieving the best viewing experience.

It should be understood that other essential components of the head-mounted virtual display helmet are well known to those skilled in the art, therefore, they will not be described herein and will not be intended to limit the present disclosure. The implementation of the head-mounted virtual display helmet may refer to the implementation of the above display device, and the description will not be repeated.

In the above display device, display method and head-mounted virtual display helmet according to the embodiments of the present disclosure, the display device is provided with a display panel, and a first lens having a first focal length, a spatial filtering component configured for filtering and a second lens having a second focal length which are arranged in order at a light exit side of the display panel. By means of the spatial filtering component and the combination of the two lenses having two different focal lengths, the above-described display device according to the embodiment of the present disclosure can alleviate the "Screen Door Effect" due to screen resolution of the display panel, thereby improving viewing experience of the virtual reality VR.

It will be apparent that various changes and modifications can be made to the present disclosure by those skilled in the art without departing from the spirit and scope of the present disclosure. Thus, it is intended to contain such changes and modifications in the present disclosure if these changes and modifications fall within the scope of the claims of the present disclosure and the equivalents thereof.

What is claimed is:

1. A display device, comprising:
   a display panel; and
   a first lens having a first focal length, a spatial filtering component configured for filtering and a second lens having a second focal length which are arranged in order at a light exit side of the display panel,
   wherein the second focal length is different from the first focal length,
   wherein the spatial filtering component is a diaphragm having an aperture which has an adjustable diameter, the diaphragm being configured to block a portion of light having a greater frequency component than a predetermined frequency value, and allow a portion of light having a smaller frequency component than the predetermined frequency value to pass through so as to be projected to the second lens,
   wherein the first lens, the diaphragm and the second lens are all located at the light exit side of the display panel, the first lens is located right in front of the display panel, the diaphragm is located right in front of the first lens, the second lens is located right in front of the diaphragm, and
   wherein a distance between the diaphragm and the first lens is equal to the first focal length, a distance between the diaphragm and the second lens is equal to the second focal length, and the second focal length is greater than the first focal length, such that the diaphragm is located on spectrum planes of the first lens and the second lens, thereby a virtual image is imaged at a side of the display panel away from the light exit side of the display panel.

2. The display device according to claim 1, wherein a distance between the display panel and the first lens is equal to the first focal length.

3. The display device according to claim 2, wherein the display panel is a liquid crystal display panel or an electroluminescent display panel.

4. A head-mounted virtual display helmet, comprising the display device according to claim 2.

5. The display device according to claim 1, wherein the first focal length is in a range of 50 mm to 70 mm.

6. The display device according to claim 5, wherein the display panel is a liquid crystal display panel or an electroluminescent display panel.

7. The display device according to claim 1, wherein each of the first lens and the second lens is a convex lens.

8. The display device according to claim 7, wherein the first lens and the second lens have a same primary optical axis; and a central point of an aperture of the diaphragm is located on the primary optical axis.

9. The display device according to claim 8, wherein the display panel is a liquid crystal display panel or an electroluminescent display panel.

10. The display device according to claim 7, wherein the display panel is a liquid crystal display panel or an electroluminescent display panel.

11. The display device according to claim 1, wherein the display panel is a liquid crystal display panel or an electroluminescent display panel.

12. A head-mounted virtual display helmet, comprising the display device according to claim 1.

* * * * *